United States Patent [19]
Chiang

[11] Patent Number: 5,387,255
[45] Date of Patent: Feb. 7, 1995

[54] STEERING BEARING ASSEMBLY FOR A BICYCLE

[76] Inventor: Douglas Chiang, No. 32, Lane 35, Tung-Jung Rd., Ta-Li Hsiang, Taichung Hsien, Taiwan, Prov. of China

[21] Appl. No.: 186,556

[22] Filed: Jan. 26, 1994

[51] Int. Cl.$^6$ .................... B62K 21/16; F16B 7/10
[52] U.S. Cl. ..................... 74/551.1; 280/279; 403/104
[58] Field of Search .................... 74/551.1–551.8; 280/279; 403/104

[56] References Cited

U.S. PATENT DOCUMENTS

| | | | |
|---|---|---|---|
| 3,787,126 | 1/1974 | Arlen | 280/279 |
| 4,068,858 | 1/1978 | Harrison et al. | 280/279 X |
| 4,850,733 | 7/1989 | Shook | 403/104 |
| 5,011,104 | 4/1991 | Fang | 403/104 |
| 5,085,063 | 2/1992 | Van Dyke et al. | 280/279 |
| 5,095,770 | 3/1992 | Rader | 74/551.3 X |
| 5,251,494 | 10/1993 | Edwards | 74/551.1 |

FOREIGN PATENT DOCUMENTS

| | | | |
|---|---|---|---|
| 653946 | 3/1929 | France | 280/279 |
| 680920 | 8/1939 | Germany | 280/279 |
| 63610 | 2/1948 | Netherlands | 280/279 |
| 874446 | 10/1981 | U.S.S.R. | 280/279 |

Primary Examiner—Vinh T. Luong
Attorney, Agent, or Firm—Oblon, Spivak, McClelland, Maier, & Neustadt

[57] ABSTRACT

The steering bearing assembly includes a bearing assembly with an upper race that has a circular inner periphery and a tubular protrusion that extends axially from the inner periphery. The tubular protrusion is provided with a plurality of axial splits and an externally threaded wall which tapers gradually toward a free end thereof. A positioning seat with an internally threaded wall that complements the external wall of the tubular protrusion is mounted around the latter and above the upper race in such a manner that the free end of the tubular protrusion extends beyond the uppermost portion of the positioning seat. The tubular protrusion retracts radially and inwardly upon tightening of the positioning seat.

3 Claims, 4 Drawing Sheets

STEERING BEARING ASSEMBLY FOR A BICYCLE

BACKGROUND OF THE INVENTION
1. FIELD OF THE INVENTION

The invention relates to a steering bearing assembly of a bicycle, more particularly to a steering bearing assembly for connecting a front wheel fork and handle bars to a frame of the bicycle.

2. DESCRIPTION OF THE RELATED ART

FIGS. 1 to 3 illustrate a steering bearing assembly which was disclosed in U. S. Pat. No. 5,095,770 and which is used to connect a front wheel fork and a handle bar to a bicycle frame. The steering bearing assembly includes a steerer tube 1, one end of which is connected to a fork 11 that carries the front wheel (not shown), a head tube 2 that is fixedly connected do an upper tube 21 and a down lower tube 22 of the bicycle frame, and a stem 3 that carries the handle bar (not shown).

The steerer tube 1 extends through the head tube 2 and through a connector 31 of the stem 3. In order for the steerer tube 1 to rotate relative to the head tube 2, a lower bearing assembly 42 and an upper bearing assembly 41 are mounted between the steerer tube 1 and the head tube 2. The upper bearing assembly 41 is located at an upper end of the head tube 2 and includes a first race 411 and a second race 412 which cooperating encase a plurality of ball bearings 413 therebetween. The first and second races 411, 412 are supported to rotate relative to one another by the ball bearings 413. The second race 412 is fixedly connected to the head tube 2 so that it rotates with the same. The first race 411 has an inner diameter that is greater than an outer diameter of the steerer tube 1 so that the steerer tube 1 is carried by the upper bearing assembly 41 with a clearance formed between the first race 411 and the steerer tube 1. The first race 411 has an annular contact face 414 which tapers at an angle with respect to a longitudinal axis of the steerer tube 1.

An annular compression ring 43 with a gap 44 is disposed above the first race 411 of the upper bearing assembly 41. The compression ring 43 has a horizontal face 430 and a tapered contact surface 431 which matches the contact face 414 of the first race 411 in the upper bearing assembly 41.

When all of the elements are in place, an adjuster nut 45 is threaded to an internally threaded upper end 12 of the steerer tube 1. The adjuster nut 45 has a head 46 that contacts an upper end of the connector 31 and that forces the same downward toward the steerer tube 1. Longitudinal and radial forces are exerted consequently on the compression ring 43 such that the latter is compressed against the steerer tube 1 and the first race 411 of the upper bearing assembly 41, thereby locking the compression spring 43 in place on the steerer tube 1.

Although the above-mentioned steering bearing assembly offers many advantages, it still has some drawbacks. For example, the internal threads at the upper end 12 of the steerer tube 1 can wear out due to constant vibration of the bicycle when in operation or after a long period of use. To replace the steerer tube 1, the user has to disassemble the entire assembly, such as the stem, the head tube or the like, thus inconveniencing the user.

SUMMARY OF THE INVENTION

A main objective of the present invention is to provide a steering bearing assembly for a bicycle frame which is avoids the above stated drawback, thereby facilitating replacement of a fastening device to fasten the steerer tube and handle bar of the bicycle frame.

An additional objective of the present invention is to provide a steering bearing assembly that includes a bearing assembly which provides a radial engagement with to the steerer tube and a fastening device which provides an axial engagement with the bearing assembly so that the steering bearing assembly is more durable than the prior art.

Accordingly, the steering bearing assembly of the present invention includes a head tube that is connected to upper and lower of a bicycle frame, a steerer tube which is inserted through the head tube and which has a first end that is connected securely to a front wheel fork of the bicycle frame and a second end that extends out from the head tube, and a bearing assembly mounted between the head tube and the steerer tube. The bearing assembly includes a lower race that is connected securely to the head tube, an upper race that is associated with the steerer tube and a plurality of ball bearings that are encased by the lower and upper races to permit relative rotation therebetween. The upper race has a circular inner periphery and a tubular protrusion that is formed with a plurality of axial splits and that extends axially from the inner periphery of the upper race toward the second end of the steerer tube. The tubular protrusion is provided with a threaded external wall that tapers gradually toward the second end of the steerer tube. The bearing assembly further includes a positioning seat mounted around the steerer tube so as to be disposed on the upper race with the tubular protrusion extending through the positioning seat. Since the positioning seat is provided with a threaded internal wall to complement the threaded external wall of the tubular protrusion, the tubular protrusion is compressed radially and inwardly to engage the steerer tube firmly when the positioning seat is tightened relative to the tubular protrusion. A mounting stem is used to connect the handle bar to the bicycle frame. The mounting stem includes a tubular connector mounted around the steerer tube and disposed above the tubular protrusion.

In the disclosed embodiment, a fastening device is used to fasten the tubular connector and the steerer tube. The fastening device includes a resilient hollow cylinder that is formed with a tapered inner wall and that is press-fitted into the second end of the steerer tube, a truncated cone-shaped inserter that is formed with an axially extending threaded bore and that is inserted into the tapered inner wall of the inserter, and a locking bolt that is formed with an enlarged head and that is threaded to the inserter. When the locking bolt is tightened, the inserter extends inwardly of the resilient member, thereby expanding the same radially and outwardly to abut against the steerer tube. At the same time, the enlarged head of the locking bolt simultaneously compresses the tubular connector downward toward the tubular protrusion so as to provide an axial engagement to the steerer tube.

Since the steering bearing assembly of the present invention employs radial and axial forces to interconnect the various elements, it is thus firmer and more durable than the conventional steering bearing assembly. In the event that the threads on the locking bolt and in the inserter are worn due to constant vibration during operation of the bicycle or due to prolonged use, replacement of those parts without the need to dismantle the other elements, such as the head tube, the tubular connector and the like.

BRIEF DESCRIPTION OF THE DRAWINGS

Other features and advantages of the present invention will become more apparent in the following detailed description of the preferred embodiment with reference to the accompanying drawings, in which.

DESCRIPTION OF THE PREFERRED EMBODIMENT

Figure 1:
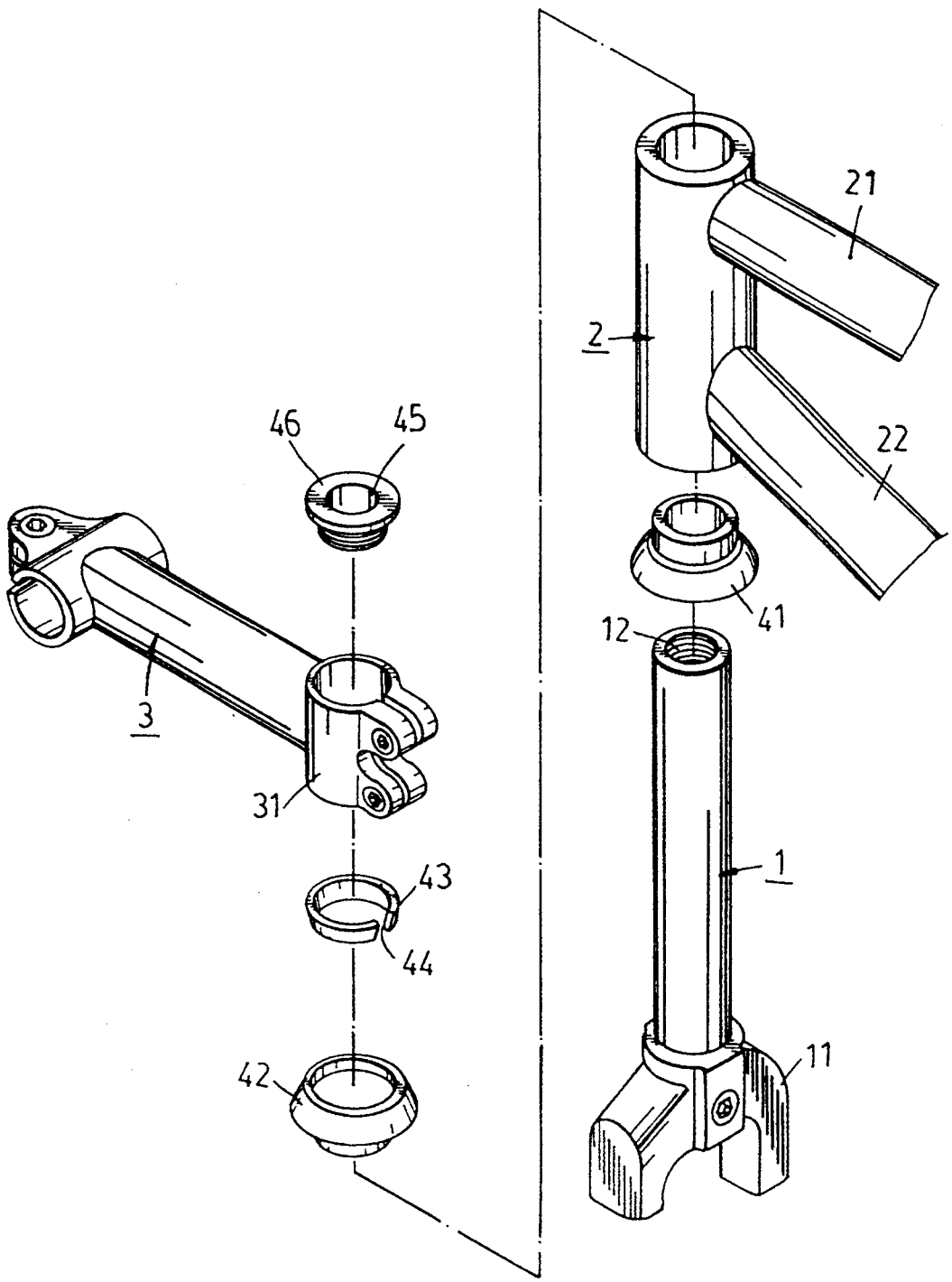
FIG. 1 shows an exploded view of the steering bearing assembly which is disclosed in U. S. Pat. No. 5,095,770 and which is used to connect a handle bar and a front wheel fork to a bicycle frame.
Figure 3:
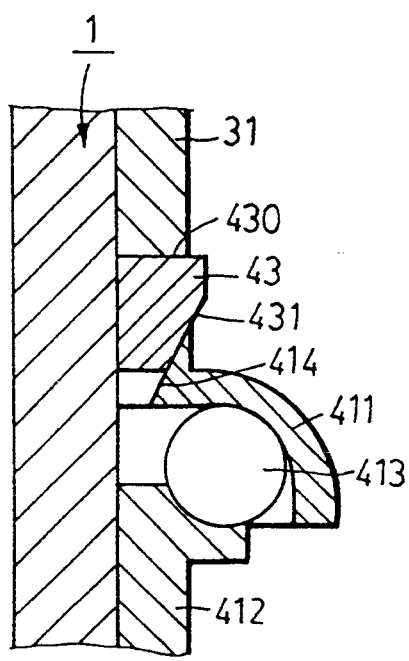
FIG. 3 an enlarged cross sectional view of the bearing assembly used in the steering bearing assembly shown in FIG. 1.
Figure 2:
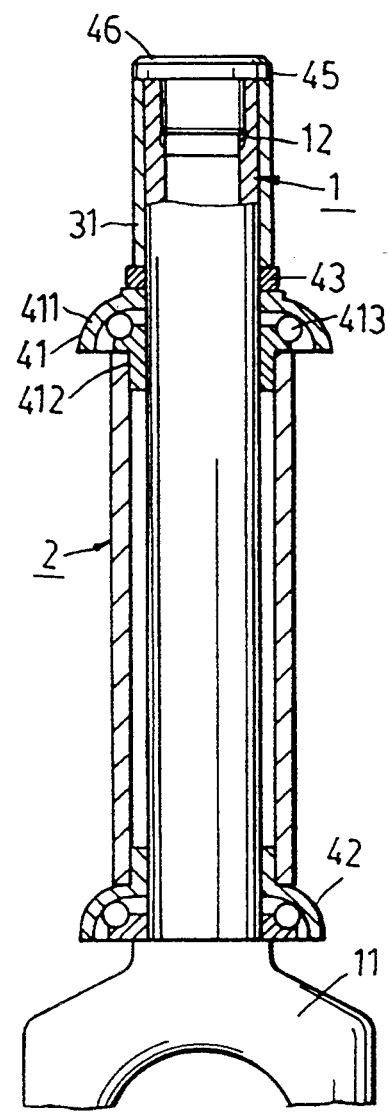
FIG. 2 is a partially cross sectional assembled view of the steering bearing assembly shown in FIG. 1.
Figure 4:
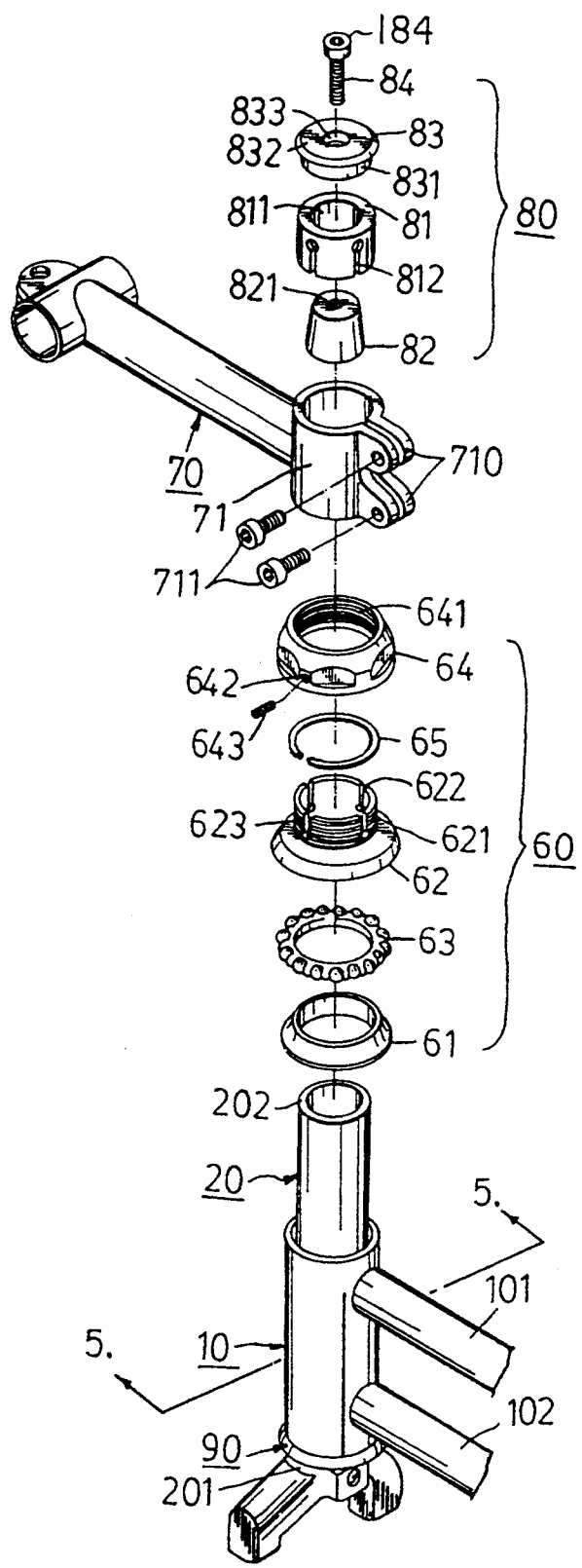
FIG. 4 illustrates an exploded view of a steering bearing assembly of the present invention.
Figure 5:
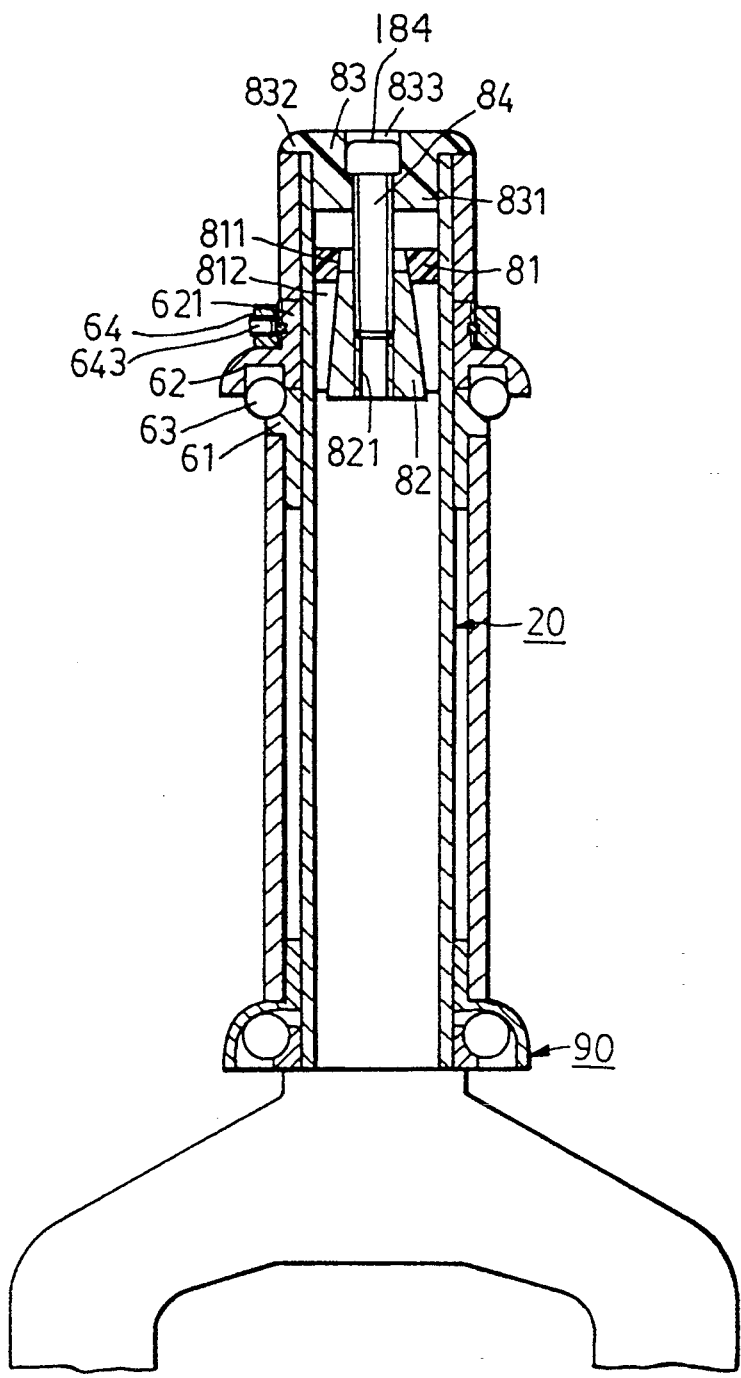
FIG. 5 is a cross sectional view of the steering bearing assembly of the present invention.

Referring to FIG. 4, a steering bearing assembly according to the present invention is shown to comprise a head tube 10, a steerer tube 20, a bearing assembly 60, a mounting stem 70 and a fastening device 80.

The head tube 10 is connected to upper and lower tubes 101, 102 of a bicycle frame. The steerer tube 20 is inserted through the head tube 10 and has a first end that is connected to a front fork 201 which carries the front wheel (not shown) and a second end 202 that extends out from the head tube 10. The steerer tube 20 must be secured relative to the head tube 10 for rotational movement with respect to the head tube 10 only when the handle bar (not shown) is turned. Thus, there is a lower bearing assembly 90 and an upper bearing assembly 60 between the steerer tube 20 and the head tube 10. The lower bearing assembly 90 is conventional in construction and will not be detailed herein. The upper bearing assembly 60 includes a lower race 61 secured fixedly to the head tube 10, an upper race 62 associated with the steerer tube 20, and a plurality of ball bearing 63 are encased cooperatively by the upper and lower races 61, 62 so as to permit relative rotation therebetween. The upper race 62 of the bearing assembly 60 has a circular inner periphery and a tubular protrusion 621 that extends axially from the inner periphery towards the second end 202 of the steerer tube 20. The tubular protrusion 621 is provided with an externally threaded wall 623 which tapers gradually toward the second end 202 of the steerer tube 20. The tubular protrusion 621 further has a plurality of axial splits 622 formed therein. A substantially annular positioning seat 64 is mounted around the steerer tube 20 so as to be disposed on the upper race 62 with the tubular protrusion 621 extending through the positioning seat 64. Since the positioning seat 64 has an internally threaded wall 641 that complements the externally threaded wall 623 of the tubular protrusion 621, the tubular protrusion 621 is compressed radially and inwardly to securely engage the steerer tube 20 when the positioning seat 64 is tightened. Thus, the upper race 62 of the bearing assembly 60 is firmly secured on the steerer tube 20. To facilitate turning of the positioning seat 64, the external wall of the same can have polygonal faces for engagement with a spanner.

To strengthen the engagement, the positioning seat 64 can be provided with a radial threaded bore 642 and a retaining C-shaped ring 65 can be provided between the tubular protrusion 621 and the positioning seat 64 before tightening the latter. Thus when the positioning seat 64 is tightened, the engagement is strengthened due the C-shaped ring 65. A retaining bolt 643 can also be threaded in the radial threaded bore 642 to compress the C-shaped ring 65 to further strengthen the engagement.

The mounting stem 70 includes a tubular connector 71 with two pairs of spaced ears 710. The tubular connector 71 is mounted around the steerer tube 20. The spaced ears 710 of the connector 71 are screwed together by a pair of bolts 711 so as to dispose a lowermost portion of the connector 71 on the tubular protrusion 621.

The fastening device 80 employed in this embodiment includes a resilient hollow member 81, a truncated cone-shaped inserter 82, a lid 83 and a locking bolt 84 with a head 184. The resilient member 81, which is preferably made of an elastic material such as plastics, is press-fitted into the second end 202 of the steerer tube 20. The resilient member 81 is shaped as a cylinder with two open ends, one of which having a diameter that is larger than that of the other, and a tapered inner wall 811 which extends therethrough from the end with the larger diameter to the other end with the smaller diameter. The resilient member 81 is further provided with a plurality of splits 812 which extend axially from the larger end toward the smaller end of the same. Alternatively, a C-shaped resilient member can be used. However, the C-shaped member must have a tapered inner wall similar to the resilient member 81. The truncated cone-shaped inserter 82 with an axially extending threaded bore 821 and is inserted into the resilient member 81. The lid 83 has an enlarged head 832 and a central hole 833 and is placed on the top of the second end 202 of the steerer tube 20. When the locking bolt 84 is threaded in the threaded bore 821 of the inserter 82, the latter extends interior of the former to expand the same radially and outwardly to abut against the steerer tube 20. During that same period, the enlarged head 832 of the lid 83 compresses the tubular connector 71, which correspondingly compresses the tubular protrusion 621 so as with provide an axial engagement to the steerer tube 20.

Note that the threads on the locking bolt 84 and in the inserter 82 may wear due to constant vibration of the bicycle during riding operation or due to prolonged use. If such a case happens, replacement of these parts can be made without the need for dismantling the other elements, such as the head tube, the tubular connector and the like. In addition, since radial and axial forces are employed to connect the composing elements in the steering bearing assembly of present invention, the present invention is thus firmer and more durable as compared to the steering bearing assembly of the previously described U. S. Patent.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A steering bearing assembly for a bicycle, comprising:
   a head tube connected to a bicycle frame;
   a steerer tube inserted through said head tube and having a first end that is adapted to be connected to a front wheel fork of said bicycle frame and a second end that extends out from said head tube;
   a bearing assembly provided between said steerer tube and said head tube, said bearing assembly including a lower race fixedly connected to said head tube, an upper race associated with said steerer tube, and a plurality of ball bearings encased between said lower and upper races to permit relative rotation therebetween, said upper race further having an inner circular periphery and a tubular protrusion that extends axially from said inner periphery toward said second end of said steerer tube, said tubular protrusion having an externally threaded wall that tapers gradually to said second end of said steerer tube and being formed with a plurality of axial splits;
   said bearing assembly further including a positioning seat mounted around said steerer tube so as to be disposed on said upper race with said tubular protrusion extending through said positioning seat, said positioning seat having an internally threaded wall to complement said externally threaded wall of said tubular protrusion so as to compress said tubular protrusion radially and inwardly, thereby firmly engaging said steerer tube upon tightening of said positioning seat;
   a mounting stem for connecting a handle bar of the bicycle frame to the steerer tube, said mounting stem having a tubular connector mounted around said steerer tube and above said tubular protrusion of said upper race;
   a resilient hollow member press-fitted into said second end of said steerer tube and having an internal wall which extends therethrough axially along said steerer tube and which tapers gradually toward said second end of said steerer tube;
   a truncated cone-shaped inserter which is formed with an axially extending threaded bore and which is inserted into said tapered inner wall of said resilient member; and
   a locking bolt with a head provided on said steerer tube above said tubular connector, said locking bolt being threadedly connected to said truncated coneshaped inserter in said threaded bore, said resilient member expanding radially and outwardly to abut against said steerer tube while said head simultaneously forces said tubular connector to compress said tubular protrusion of said upper race in said bearing assembly to retain said steerer tube vertically in said bearing assembly when said locking bolt is tightened.

2. The steering bearing assembly as defined in claim 1, wherein said resilient hollow member is shaped as a cylinder with two open ends, one of which having a diameter larger than that of the other, said resilient member being formed with a plurality of splits that extend axially from said end with the larger diameter toward the other end.

3. The steering bearing assembly as defined in claim 1, wherein said positioning seat further has a radial threaded bore, said bearing assembly further including a C-shaped retaining ring provided around said tubular protrusion so as to be disposed between said tubular protrusion and said positioning seat, and a retaining bolt threaded in said threaded radial bore of said positioning seat to compress said C-shaped retaining ring.

* * * * *